US006055473A

United States Patent [19]

Zwolinski et al.

[11] Patent Number: 6,055,473

[45] Date of Patent: Apr. 25, 2000

[54] ADAPTIVE SEATING SYSTEM

[75] Inventors: Joseph John Zwolinski, Warren; Liwen Xu; Hassan Anahid, both of Troy; Mark Allan Oleszko, Warren; Yibing Dong, Rochester Hills, all of Mich.

[73] Assignee: General Motors Corporation, Detroit, Mich.

[21] Appl. No.: 08/801,218

[22] Filed: Feb. 19, 1997

[51] Int. Cl.[7] .......... B60R 22/00

[52] U.S. Cl. .......... 701/49; 701/45; 296/65.1

[58] Field of Search .......... 364/558; 701/20, 701/45, 49; 248/558; 296/65.1

[56] References Cited

U.S. PATENT DOCUMENTS

| | | | |
|---|---|---|---|
| 4,797,824 | 1/1989 | Sugiyama et al. | 701/20 |
| 5,058,852 | 10/1991 | Meier et al. | 248/588 |
| 5,170,364 | 12/1992 | Gross et al. | 364/558 |
| 5,748,473 | 5/1998 | Breed et al. | 701/45 |

*Primary Examiner*—William A. Cuchlinski, Jr.
*Assistant Examiner*—Arthur D. Donnelly
*Attorney, Agent, or Firm*—Kathryn A. Marra

[57] ABSTRACT

Adaptive seating comfort control automatically senses occupation of a seat, estimates attributes of the seat occupant, and generates and issues seating comfort control commands in response to the occupant attributes to provide for maximum seating comfort and to provide for a desired interaction with other control systems. Comfort control commands take the form of desired pressure commands for at least one fluid filled bladder within the seat and may be updated periodically during a period of seat occupation to account for change in position of the seat occupant or to reduce occupant muscle fatigue.

11 Claims, 3 Drawing Sheets

ADAPTIVE SEATING SYSTEM

TECHNICAL FIELD

This invention relates to automotive seating and, more particularly, to automatic seat comfort control.

BACKGROUND OF THE INVENTION

Manually-controlled automotive seating systems are known. Such systems may include seating firmness control for seat occupant comfort in which the occupant manually controls actuators for varying fluid pressure in one or more bladders within a seat. To assure occupant comfort, the fluid within each bladder must be set to a pressure corresponding to the physical attributes of the seat occupant and to the occupant's position within the seat. In a seating system having a plethora of such bladders, the manual process of bladder pressure adjustment can be difficult and time consuming. Unless the occupant takes the time to properly adjust all bladders, the seat may be uncomfortable. As a single occupant shifts in position within the seat, the pressure requirements within the bladders may change, requiring further manual input to assure seating comfort. Over an extended driving period, occupant comfort requirements may change and an initial fluid pressure setting within one or more of the bladders may require updating. Occupant muscle fatigue and discomfort may result unless proper manual pressure adjustment is provided. Manually controlled automotive seating systems may further include manually controlled actuators for positioning or orienting the seat. Unless the seat position or orientation corresponding to the attributes of the seat occupant and the position of the seat occupant within the seat is identified and maintained throughout a period of occupation of the seat, occupant comfort may be reduced and proper interaction of the seating system with other systems may not be assured.

It would therefore be desirable to provide an automotive seating control system that assures proper seating control with minimum burden placed on the seat occupant to establish and maintain proper settings of a seating control system.

SUMMARY OF THE INVENTION

The present invention is directed to a seating control system that automatically identifies seat occupant requirements and adjusts the seat accordingly to maximize occupant comfort and to assure proper interaction with other systems.

More specifically, a vehicle seating control system includes a plurality of bladders secured within a seat and a fluid pressure control system for controlling passage of a fluid, such as air, into and out of the plurality of bladders. At least one pressure transducer is secured within the seat and transduces pressure applied to the seat into a signal passed to control circuitry. The control circuitry periodically samples the pressure signals applied thereto and estimates attributes, such as corresponding to occupant height or weight and occupant orientation within the seat in response to the signal samples. Seating system adjustments are made in response to the estimated occupant information to yield a desirable seat orientation to maximize comfort and to support a desired interaction with other vehicle systems.

In accord with a further aspect of this invention, after providing for an initial control setting of the seating system, the control circuitry periodically samples the signal values to determine if any change in occupant position or orientation within the seat has occurred. If a change has occurred, adjustments are determined and are made to maintain a desirable seat orientation throughout a period of occupation of the seat. In accord with yet a further aspect of this invention, the time of occupation of the seat is monitored. If such time exceeds a threshold time corresponding to an extended period of occupation of the seat, a slight adjustment of the seat orientation is automatically made to reduce occupant muscle fatigue. The threshold time is identified as the typical time of occupation after which muscle fatigue is likely. Such adjustments may be periodically provided throughout a period of occupation of the seat and, over an extended period of occupation, may become more frequent as a propensity for occupant muscle fatigue increases. The seat orientation information may be stored for re-use from one period of seat occupation to the next.

In accord with yet a further aspect of this invention, the seating adjustments automatically made in response to estimated occupant attributes or orientation within the seat include seat positioning adjustments. In a seating system in which a headrest is positioned adjacent a seatback, such adjustments may take the form of variation of the position of the headrest relative to the position of the seatback.

In accord with a further aspect of this invention, the sensors take the form of pressure transducers disposed within pneumatic control lines opening into sealed bladders positioned at various locations within the seat. The bladders are maintained at a nominal pneumatic pressure. Occupation of the seat is detected when the sensor output signals indicate a significant increase in pressure across the bladders, which initiates a determination of occupant information and automatic control of the pressure within the bladders, such as through a series of valved pneumatic lines for passing pressurized air to and from the bladders. In accord with still a further aspect of this invention, manual override of the automatic seating control is provided immediately upon a manual control input through a seat occupant interface. Automatic control is resumed when manually requested by the seat occupant.

In accord with yet a further aspect of this invention, the established occupant information may be communicated to other vehicle control systems so that any required adjustment to the operation of such systems may be made to most suitably accommodate the current occupant or occupants of the vehicle.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
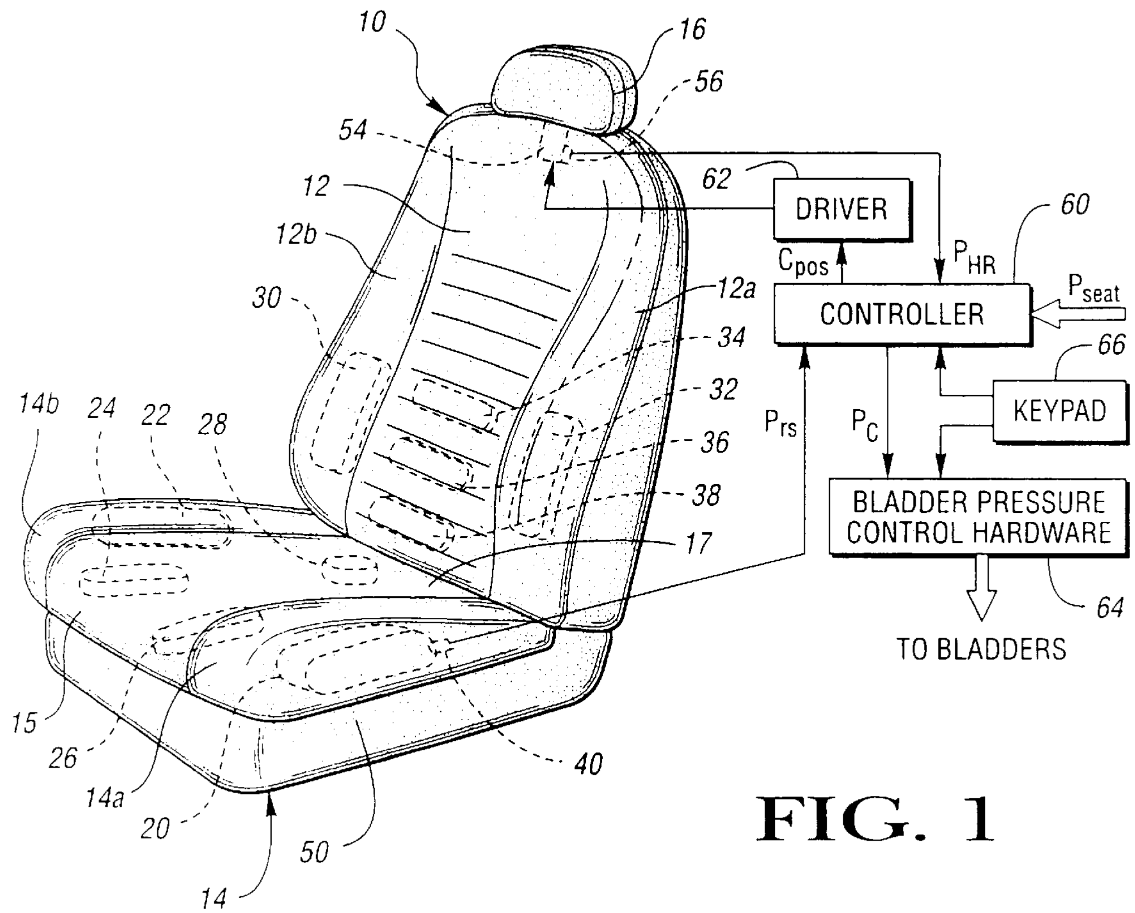
FIG. 1 is a perspective view of an automotive vehicle seat with an installation of the automatic seat control system of this embodiment, the seat control system being schematically shown.

Referring to FIG. 1, an automotive vehicle seat 10 includes a seatback 12 secured to a seat cushion 14 in any suitable conventional manner. A plurality of sealed bladders 20–38 are retained within the seatback 12 and seat cushion 14 in any suitable conventional manner and a pneumatic pressure control system operates, in accord with principles of this invention, to automatically vary the air pressure within the bladders. The series of bladders of this embodiment include left and right seat cushion wing bladders 20 and 22, respectively, within corresponding left and right seat cushion wings 14*a* and 14*b*, respectively, within respective left and right seatback wings 12*a* and 12*b*, left and right thigh support bladders 26 and 24, respectively, butt pocket area bladder 28, left and right seatback wing bladders 32 and 30, respectively, within respective left and right seatback wings 12*a* and 12*b*, and upper, middle and lower lumbar support bladders 34, 36, and 38, respectively. A headrest 16 is positioned adjacent the seatback 12 at an upper end thereof and is mechanically linked to an output shaft (not shown) of a linear actuator 54. The linear actuator 54 takes the form of a conventional DC motor or stepper motor secured within the seatback 12 and is electrically driven to raise and lower the headrest 16 relative to the seatback 12 in response to control command Cpos issued by a controller 60 through a standard motor driver interface 62. A linear position transducer 56, such as in the form of a standard linear potentiometer, is installed adjacent the actuator 54 to transduce the position of the actuator output shaft into output signal $P_{HR}$. For example, the transducer 56 may include a wiper arm that slides along a resistive, electrically conductive track of the transducer as the actuator output shaft is raised and lowered, with a constant electrical potential applied across the resistive track, whereby the electrical resistance between one end of the conductive track and the wiper arm is proportional to the position of the headrest 16, as is generally known in the art.

The controller takes the form of a single chip microcontroller, such as a commercially available Motorola MC68HC11 microcontroller. The controller 60 receives the transducer output signal $P_{HR}$ from the position transducer 56 and receives pressure signals Prs from standard pressure transducers disposed within pneumatic control lines that open into the bladders 20, 24, 26, 28, 30, 34, 36, and 38, or directly within the bladders 20–38 themselves, only one pressure transducer 40 being shown in FIG. 1. Bladders 20 and 22 and bladders 30 and 32 share a common pressure transducer as they open into and therefore are maintained at substantially a common pressure, as will be further detailed in FIG. 2. A plurality of conventional seat position transducers, for example of the potentiometric type, are secured to the seat position control assembly, which may take any conventional form including either manual or power control capability. The seat position transducers provide output signals indicating the orientation of the seat 10, including the fore/aft seat position, the angle of the seatback 12, and the lift position of both the front 15 and rear 17 of the seat cushion 14. The manner of transducing and indicating such seat position information is generally understood in the seating control art. The seat position signals, indicated generally as seat position signal Pseat (FIG. 1), are provided as inputs to controller 60. A keypad 66 of any suitable standard form transduces command information manually provided by an operator (such as a seat occupant) into control signals passed to the controller 60 and to bladder pressure control hardware, generally illustrated in FIG. 1 by block 64. The keypad 66 may include any combination of suitable standard buttons, levers, dials, or any other conventional apparatus known in the art to transduce manual commands into electrical signals and is positioned in the vehicle interior in position to be easily accessed by the vehicle operator. The bladder pressure control hardware 64 includes a combination of pumps, valves, and control circuitry for individually controlling pressure within the bladders 20–38 in response to either manual commands from the operator via the keypad 66 or automatic control commands PC issued by the controller 60, with manual commands having control priority to override any automatic commands in this embodiment, as will be described further.

Figure 2:
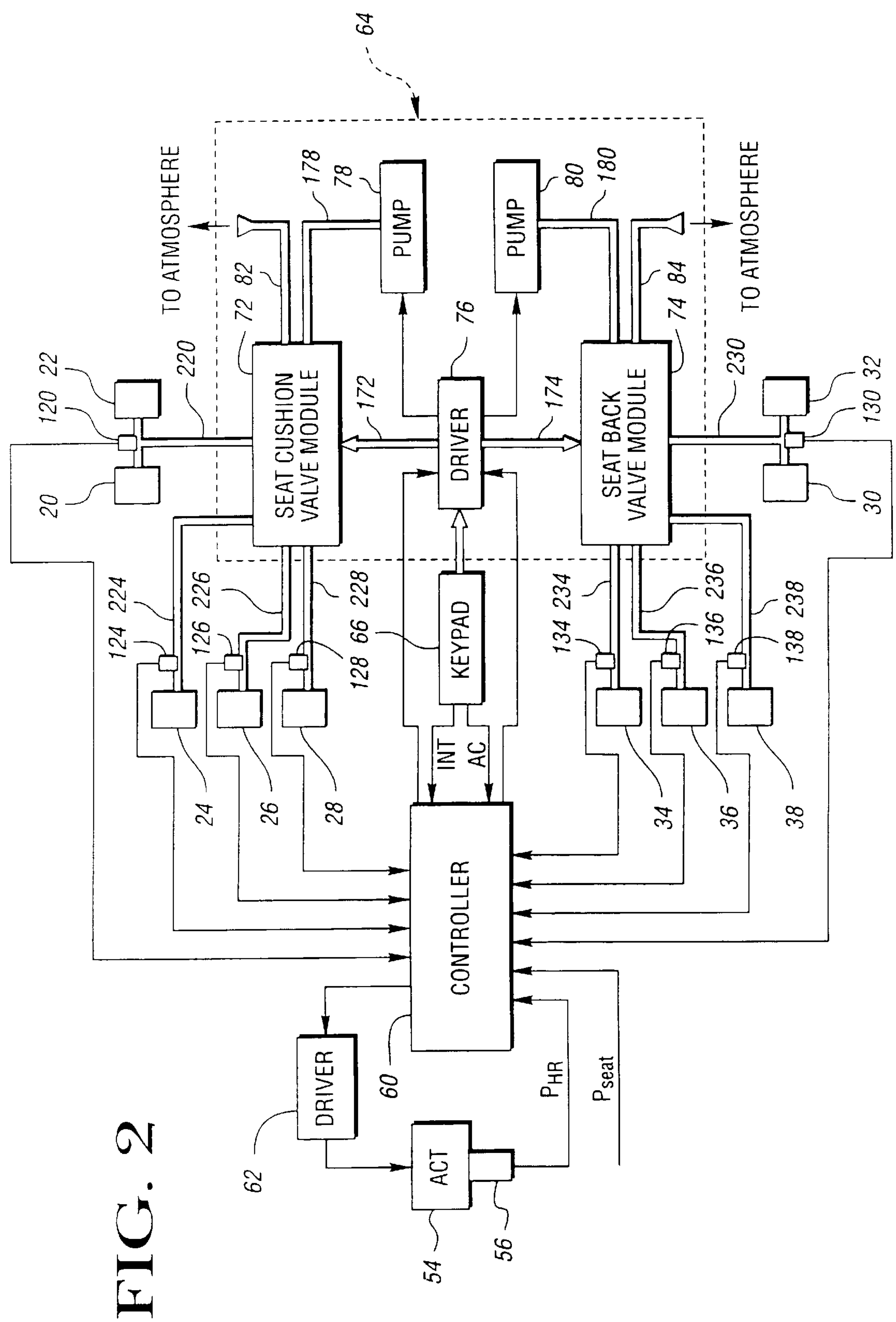
FIG. 2 is a general block diagram of the seat control hardware of the seat control system of FIG. 1.

Referring to FIG. 2, further details of the pressure control system of this embodiment are illustrated. Generally, manual control inputs from an operator (such as a seat occupant) via keypad 66 are given a higher control priority than the automatic control commands generated by controller 60, whereby automatic control operations will immediately cease upon receipt of any manual input via the keypad 66 and will not resume unless an appropriate key on the keypad 66 is depressed, such as a key labeled "AUTOMATIC CONTROL" or a like legend. The keypad 66 includes at least two discrete output signals AC and INT. AC is set to an active signal level when automatic control is requested by the operator and INT changes state when manual control is initiated by an operator, such as by applying a manual input to the keypad 66. The signal AC is a digital signal applied to a standard input port of the controller 60 which is periodically polled through controller operations to determine whether automatic control is desired, as will be further detailed. The signal INT is an interrupt signal received at a standard input port of the controller 60 to trigger an interrupt of controller operations when the signal changes state.

The bladder pressure control hardware 64 of FIG. 1 is further detailed in FIG. 2 and generally includes a driver 76, seat cushion and seat back drive modules, 72, and 74, respectively, pumps 78 and 80, and pneumatic control lines 82, 84, 178, 180, and 220–238. The keypad 66 is directly coupled to the driver 76 which includes standard control and drive circuitry for selectively activating and driving first and second air pumps 78 and 80, and for controlling the seat cushion valve module 72 and the seatback valve module 74. The pumps 78 and 80 are commercially available air pumps of any suitable form. The seat cushion valve module 72 includes a standard valve body for receiving pressurized air from air pump 78 via supply line 178 and opening to the atmosphere via exhaust line 82 and, through a series of standard electronically controlled valves of the solenoid, butterfly, or other conventional type, for selectively coupling the supply line 178 or exhaust line 82 to any of the pressure control lines 220–228.

The pressure control lines 220–228 open into bladders in the seat cushion. More specifically, control line 220 opens into bladders 20 and 22, control line 224 opens into bladder 24, control line 226 opens into bladder 26, and control line 228 opens into bladder 28. Pressurized air in the supply line 178 is passed through the seat cushion valve module 74 to any bladder requiring an increase in air pressure therein up to a pressure limit, as commanded manually via keypad 66 or as commanded through the operations of controller 60. In the event a reduction in air pressure in any of the bladders 20–28 is commanded manually via the keypad 66 or automatically via the controller 60, the seat cushion valve module 72 opens a passage between the control line of such bladder to the exhaust line 82 to allow the pressurized air to be exhausted to the atmosphere. Pressure transducers 120, 124, 126, and 128 are disposed within respective control lines 220, 224, 226, and 228, to transduce the air pressure in the respective control line and therefore in the corresponding bladder into an output signal which is applied to input ports of the controller 60. The driver 76 generates control commands for controlling the position of the valves within the seat cushion valve module 72 and communicates the commands via a standard communication link 172.

The seatback valve module 74 includes a standard valve body for receiving pressurized air from air pump 80 via supply line 180 and opening to the atmosphere via exhaust line 84 and, through a series of standard electronically controlled valves of the solenoid, butterfly, or other conventional type, for selectively coupling the supply line 180 or exhaust line 84 to any of the pressure control lines 230–238. The pressure control lines 230–238 open into bladders in the seatback. More specifically, control line 230 opens into bladders 30 and 32, control line 234 opens into bladder 34, control line 236 opens into bladder 36, and control line 238 opens into bladder 38.

Pressurized air in the supply line 180 is passed through the seat back valve module 74 to any bladder requiring an increase in air pressure therein up to a pressure limit, as commanded manually via keypad 66 or as commanded through the operations of controller 60. In the event a reduction in air pressure in any of the bladders 30–38 is commanded manually via the keypad 66 or automatically via the controller 60, the seatback valve module 74 opens a passage between the control line of such bladder to the exhaust line 84 to allow the pressurized air to be exhausted to the atmosphere. Pressure transducers 130, 134, 136, and 138 are disposed within respective control lines 230, 234, 236, and 238 to transduce the air pressure in the respective control lines and therefore in the corresponding bladder into an output signal which is applied to input ports of the controller 60. The driver 76 generates the control commands for controlling the position of the valves within the seatback valve module 74 and communicates the commands to the module 74 via a standard communication link 174.

The controller 60 issues a position control command for controlling the spacing between the headrest 16 (FIG. 1) and the seatback 12 and applies the control command to the actuator 54 via a standard motor driver 62. The displacement of the actuator output shaft (not shown), which is secured to the headrest 16 of FIG. 1 is transduced by conventional displacement sensor 56 into output signal $P_{HR}$ which is applied to a standard controller input port for use in closed-loop control of the headrest position. Likewise, the controller 60 outputs seat bladder pressure control commands to the driver 76 for varying the pressure within the bladders 20–38 when automatic pressure control operations are active. The seat position signal information is provided directly from the described conventional position transducers (not shown) to the controller 60.

Figure 4:
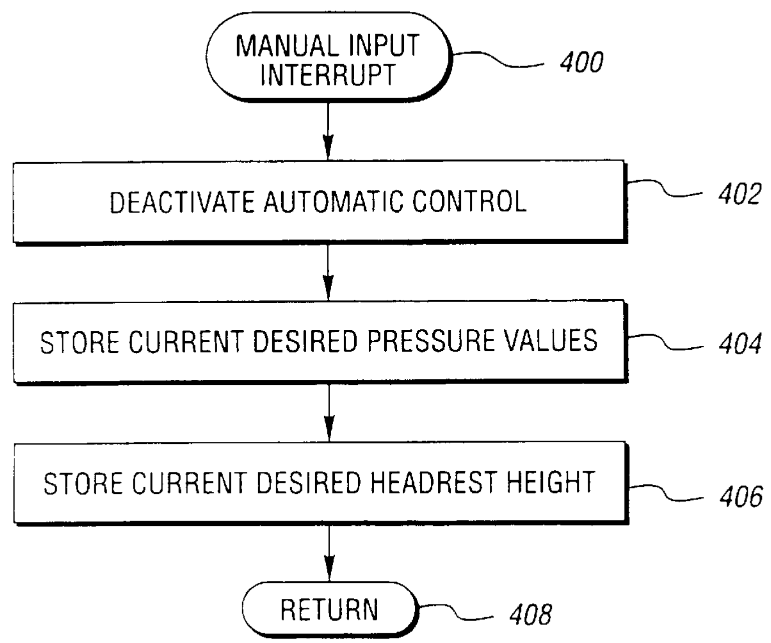
FIGS. 3 and 4 are flow diagrams illustrating a control sequence for carrying out automatic seat control operations through the hardware of FIG. 2.
Figure 3:
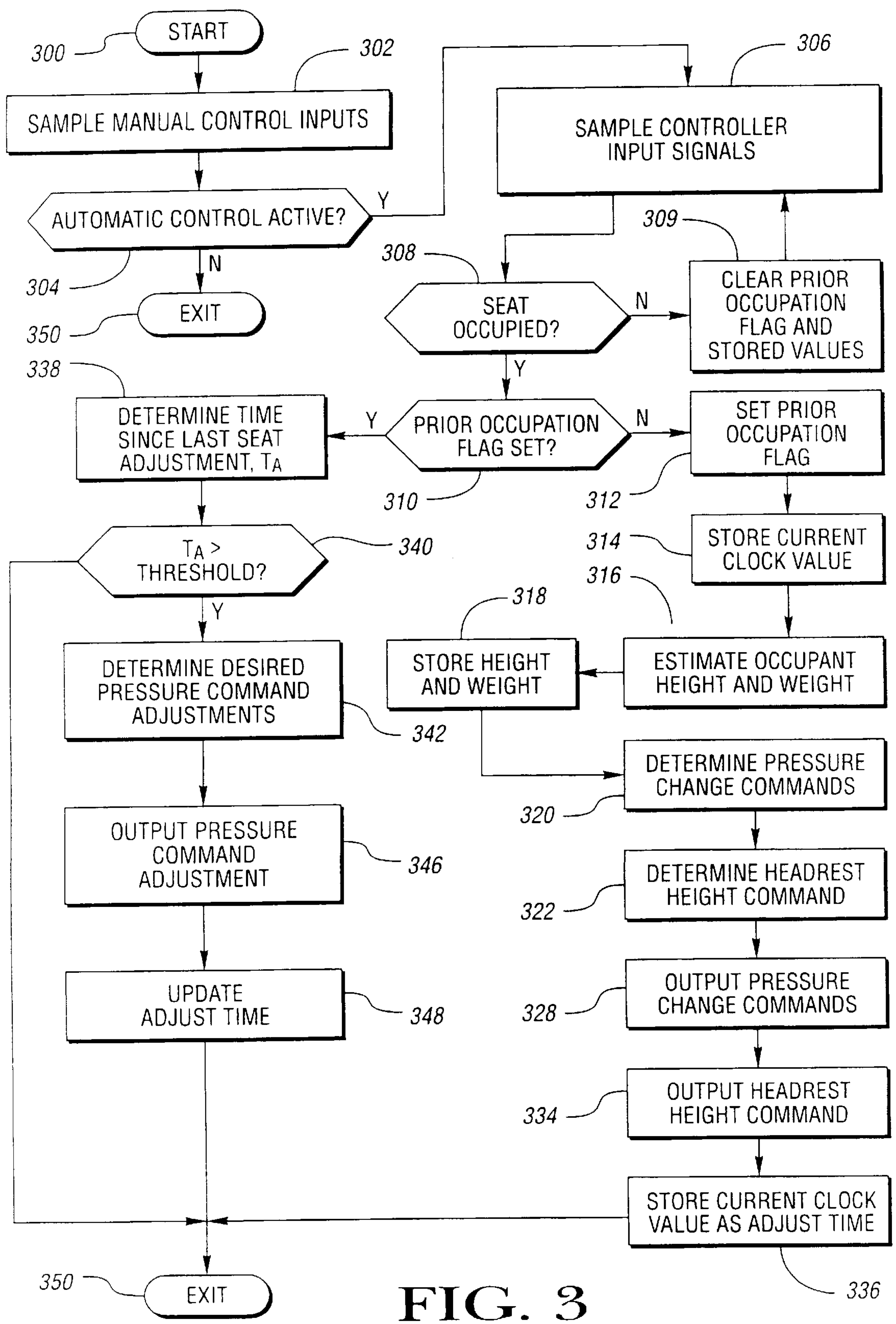

The pressure control operations of this embodiment are illustrated in a step by step manner in FIGS. 3 and 4. Generally, the operations are implemented as a sequence of instructions stored in a standard read only memory device (not shown) in the controller 60 and are read from such device and executed in a conventional step-by-step manner while ignition power is manually applied by an operator to the controller 60 (FIG. 2), such as while an ignition cylinder is maintained in an “on” or “run” position, or the like. More specifically, the sequence of operations of FIG. 3 are repeatedly carried out by the controller 60 on a timed basis, such as about once every millisecond while ignition power is applied to the controller 60, and the sequence of operations of FIG. 4 are carried out following any manual control command applied to the keypad 66 (FIG. 2) by an operator. The operations of FIG. 3 provide for automatic seating control and the operations of FIG. 4 provide for manual override of such automatic control.

Referring to FIG. 3, the illustrated seating control operations are initiated at a step 300 and proceed to sample manual control input signals from the keypad 66 (FIG. 2) at a next step 302. The manual control input signals include a signal AC indicating a request to switch from manual to automatic seating control and a plurality of manual control signals for directly controlling the pressure within the bladders 20–38 (FIG. 2). A flag indicating an active state for automatic seating control is next polled at a step 304. If the flag is set, automatic control operations are carried out via the steps 306–348. If the flag is not set, the control operations are concluded at a next step 350, for example by redirecting the controller to other of its tasks, such as general maintenance or diagnostic operations. The flag indicating an active state for automatic seating control may be set in this embodiment when an operator manually requests automatic control, such as through depression of any suitable button on the keypad 66 labeled “automatic control” or the like which sets signal AC to an active signal level, as described. The flag may also be set automatically at the start of each vehicle ignition cycle. The flag remains set until manual control is requested, such as through any pressure change command manually input by an operator via the keypad 66 (FIG. 2), as will be described.

Returning to step 304, if the flag is determined to be set, automatic control operations begin by sampling the pressure input signals from the pressure transducers 120–138 (FIG. 2), the seat position signals Pseat and the position signal $P_{HR}$ indicating headrest 16 (FIG. 1) height at a step 306. If the pressure signals indicate a substantial pressure increase above predetermined nominal pressure values, wherein the nominal pressure is determined through a standard calibration process, then the seat is assumed to be occupied at a next step 308. Otherwise, the seat is assumed to be vacant at the step 308, and a step 309 is then executed to clear memory values corresponding to the prior occupant, including a seat occupied flag and stored values indicating the height and weight of the prior occupant, and desired pressure values and a desired headrest height value. After the step 309, the sampling operations of the step 306 are repeated, and the sampled values analyzed at the step 308 to determine if the seat is occupied. The steps 306, 308, and 309 are repeated until occupation is detected at the step 308. Upon detecting occupation of the seat, a prior occupation flag is next polled at a step 310. If the prior occupation flag is set, then the seat has been occupied for at least the last two iterations of the routine of FIG. 3, and the control operations of steps 338–348 are carried out to determine if any pressure adjustments are currently necessary. If the prior occupation flag is not determined to be set at the step 310, then the current iteration of the operations of FIG. 3 is the first since the current set occupant has been detected, and seat setup operations of steps 312–336 are required, beginning by setting the prior occupation flag at the step 312, and storing the current value of any available free running clock in the controller 60 (FIG. 2) to a memory location at a step 314. The occupant's height and weight are next estimated as a function of the pressure signal and seat position samples taken at the most recent prior execution of the operations of step 306. In this embodiment, within the general layout of the bladders 20–38 and corresponding pressure transducers 120–138 described for FIGS. 1 and 2, the occupant's height H is estimated in millimeters as follows:

$$H=K1+C1*\Delta P_{CW}-C2*\Delta P_{LT}-C3*\Delta P_{UL}-C4*\Delta P_{LL}+C5*\Delta P_{BP}-C6*\Delta P_{RT}-C7*P_{FA}$$

in which $\Delta P_{CW}$ is the pressure difference between the current pressure and a predetermined nominal pressure, termed the “vacant pressure” of the seat cushion wing bladders 20 and 22 (FIG. 1), $\Delta P_{LT}$ is the pressure difference between the current pressure and the "vacant pressure" of the left thigh support bladder 26 (FIG. 1), $\Delta P_{UL}$ is the pressure difference between the current pressure and the "vacant pressure" of the upper lumber bladder 34 (FIG. 1), $\Delta P_{LL}$ is the pressure difference between the current pressure and the "vacant pressure" of the lower lumber bladder 38 (FIG. 1), $\Delta P_{BP}$ is the pressure difference between the current pressure and the "vacant pressure" of the butt pocket bladder 28 (FIG. 1), $\Delta P_{RT}$ is the pressure difference between the current pressure and the "vacant pressure" of the right thigh support bladder 24 (FIG. 1), and $P_{FA}$ is the transduced "fore/aft" position of the seat 10 (FIG. 1). The "vacant pressure" is the pressure transduced by a pressure transducer under predetermined nominal conditions, such as while the seat is vacant. The constant K1 and the coefficients C1–C7 may be determined through a conventional calibration process in which the relationship between the pressure distribution about the seat 10 (FIG. 1) and the height of the occupant is established.

Returning to FIG. 3, after estimating the occupant's height H, the occupant's weight W is determined in kilograms at the step 316 as follows:

$$W=K2+C11*\Delta P_{CW}-C12*\Delta P_{LT}+C13*\Delta P_{UL}+C14*\Delta P_{LL}-C15*\Delta P_{BP}+C16*\Delta P_{RT}-C17*P_{FA}.$$

The constant K2 and the coefficients C11–C17 may be determined through a conventional calibration process in which the relationship between the pressure distribution about the seat 10 (FIG. 1) and the weight of the occupant is established.

Returning to FIG. 3, the estimated height and weight are next stored in memory at a step 318. In an alternative embodiment within the scope of this invention, the controller 60 periodically outputs the determined height H and weight W information on a standard communication link (not shown) to other vehicle control or diagnostic systems that may benefit from such information, such as chassis or suspension control systems. Such other control systems may then take action to adjust control commands or diagnostic information in response to the occupant information to better provide for vehicle control or diagnostics, for example by adjusting the vehicle ride softness to most appropriately accommodate the current seat occupant. In an embodiment of this invention in which occupant height and weight information for is estimated through the operations of FIG. 3 for each seat occupant within the vehicle, and such information is provided to other control systems or to diagnostic systems through a standard communication link (not shown), comprehensive control or diagnostic enhancements to such other systems may be provided.

Returning to step 318, after storing H and W, a set of desired ladder pressure change values ΔPC for adjusting the pressure in the bladders 20–38 (FIG. 1) to automatically provide a desirable level of occupant comfort are next determined at a step 320 as a function of the estimated occupant height and weight of the occupant, generally as follows:

$$\Delta PC=f(H,W,CP)$$

in which CP is the current bladder pressure reading. More specifically, the individual bladder pressure change values are expressed in expanded form broken down into the individual components of the occupant's height and weight calculation terms, as follows.

$$\Delta PC_{LT}=K3-C20*\Delta P_{CW}+C21*\Delta P_{LT}+C22*\Delta P_{BP}-C23*\Delta P_{RT}+C24*\Delta P_{CW}*P_{FC}-C25*\Delta P_{LT}*P_{FC}-C26*\Delta P_{BP}*P_{FA}+C27*\Delta P_{RT}*P_{FC}+C28*\Delta P_{ML}*P_{FC}+C29*(\Delta P_{LT})^2*(\Delta P_{RT})^2.$$

In which $\Delta PC_{LT}$ is the commanded change in pressure in the left thigh support bladder 26 (FIG. 1), expressed in volts, $P_{FC}$ is the transduced lift position away from a base lift position of the front 15 of the seat cushion 14, $\Delta P_{ML}$ is the pressure change away from a calibration pressure of the middle lumber support bladder 36 (FIG. 1), K3 is a calibration constant, and C21–C29 are calibration coefficients.

$$\Delta PC_{RT}=K4-C30*\Delta P_{CW}+C31*\Delta P_{LT}+C32*\Delta P_{UL}-C33*\Delta P_{BP}-C34*\Delta P_{RT}+C35*P_{FC}-C36*P_{SB}+C37*\Delta P_{BP}*P_{SB}-C38*\Delta P_{BW}*P_{FC}-C39*\Delta P_{RT}*P_{FA}.$$

In which $\Delta PC_{RT}$ is the commanded change in pressure in the right thigh support bladder 24 (FIG. 1), expressed in volts, $\Delta P_{BW}$ is the change in pressure of the backwing support bladders 30 and 32 away from a "vacant pressure," $P_{SB}$ is angle of the seatback 12 (FIG. 1) relative to a predetermined angle, K4 is a calibration constant, and C31–C39 are calibration coefficients.

$$\Delta PC_{BP}=K5-C40*\Delta P_{LL}-C41*\Delta P_{RT}-C42*P_{FC}-C43*\Delta P_{CW}*P_{FA}+C44*\Delta P_{CW}*P_{RC}-C45*\Delta P_{CW}*P_{FC}+C46*\Delta P_{CW}*P_{SB}+C47*\Delta P_{LT}*P_{FA}+C48*\Delta P_{LT}*P_{FC}-C49*\mathrm{EXP}[(\Delta P_{LT}+\Delta P_{RT})*P_{FA}]+C410*(\Delta P_{RT}+\Delta P_{LT})+C411*\Delta P_{BP}^2+C412*P_{FC}^2-C413*P_{RC}^2.$$

In which $\Delta PC_{BP}$ is the commanded change in pressure in the butt pocket support bladder 28 (FIG. 1), expressed in volts, EXP[] is notation for the exponential function, $P_{RC}$ is the lift position of the rear section 17 of the seat cushion 16 (FIG. 1), K5 is a calibration constant, and C40–C413 are calibration coefficients.

$$\Delta PC_{CW}=K6+C50*\Delta P_{CW}-C51*\Delta P_{LT}+C52*\Delta P_{BP}-C53*\Delta P_{BW}-C54*\Delta P_{RT}+C55*P_{FC}+C56*P_{SB}-C57*\Delta P_{LT}*P_{SB}.$$

In which $\Delta PC_{CW}$ is the commanded change in pressure in the seat cushion wings support bladders 20 and 22 (FIG. 1), expressed in volts, K6 is a calibration constant, and C50–C57 are calibration coefficients.

$$\Delta PC_{UL}=K7-C60*\Delta P_{CW}+C61*\Delta P_{LT}+C62*\Delta P_{LL}+C63*\Delta P_{BP}-C64*\Delta P_{RT}+C65*P_{FC}+C66*\Delta P_{ML}*P_{FC}$$

in which $\Delta PC_{UL}$ is the commanded change in pressure in the upper lumbar support bladder 34 (FIG. 1), expressed in volts, K6 is a calibration constant, and C60–C66 are calibration coefficients.

$$\Delta PC_{ML}=K7+C70*\Delta P_{LT}-C71*\Delta P_{RT}+C72*\Delta P_{ML}-C73*P_{FA}+C74*P_{FC}-C75*\Delta P_{LT}*P_{FC}-C76*\Delta P_{UL}*\Delta P_{ML}+C77*\Delta P_{UL}*P_{FC}-C78*\Delta P_{UL}*P_{SB}-C79*(\Delta P_{BP})^2+C710*\Delta P_{LL}*P_{SB}+C711*\Delta P_{RT}*P_{SB}.$$

In which $\Delta PC_{ML}$ is the commanded change in pressure in the middle lumber support bladder 36 (FIG. 1), expressed in volts, K7 is a calibration constant, and C70–C711 are calibration coefficients.

$$\Delta PC_{LL} = K8 - C80*\Delta P_{LT} - C81*\Delta P_{UL} + C82*\Delta P_{BP} - C83*\Delta P_{BW} + C84*\Delta P_{RT} - C85*\Delta P_{ML} + C86*\Delta P_{LT}^2 - C87*\Delta P_{LT}*\Delta P_{BP} + C88*\Delta P_{LT}*P_{SB} - C89*\Delta P_{BP}*\Delta P_{RT} - C810*\Delta P_{BP}*P_{FC} - C811*\Delta P_{LL}*P_{RC} + C812*\Delta P_{ML}*P_{FC}.$$

In which $\Delta PC_{LL}$ is the commanded change in pressure in the lower lumbar support bladder 38 (FIG. 1), expressed in volts, K8 is a calibration constant, and C80–C812 are calibration coefficients.

$\Delta PC_{BW}$ is the commanded change in pressure in the seat back wing bladders 30 and 32 (FIG. 1), expressed in volts, and is set to about seven volts in this embodiment in which seatback 12 is sufficiently wide that pressure adjustments in the seat back wings 30 and 32 are not detectable for most small and medium sized occupants, so a constant pressure value consistent with comfort for large occupants is maintained.

The pressure change commands determined at the step 320 may be stored in controller 60 (FIG. 1) in a standard memory device. Following determination and storage of the pressure change commands at the step 320, a headrest height command, expressed in volts, is determined at a step 322 as a function of the occupant's estimated height H and weight W to provide for a desirable level of occupant comfort and in a manner consistent with generally-recognized seating design constraints. Specifically, in this embodiment, the headrest height $HC_{HR}$ is determined as follows:

$$HC_{HR} = K9 + C90*[C91*\Delta P_{CW} - C92*\Delta P_{LT} + C93*\Delta P_{UL} - C94*\Delta P_{BP} - C95*\Delta P_{BW} + C96*\Delta P_{RT} - C97*\Delta P_{ML} - C98*P_{HR} - C99*P_{FA} - C910*P_{SB} + K10]$$

in which K9 and K10 are calibration constants, $P_{HR}$ is sensed headrest height as indicated by the output signal of sensor 56, and C90–C910 are calibration coefficients determined through a conventional calibration process, as described above.

After determining the headrest height command at the step 322, the pressure change commands are output to the driver 76 (FIG. 2) at a next step 328 to initiate activation of the applicable pumps 78 and 80 (FIG. 2) and to direct the valve modules 72 and 74 as necessary to vary pressure in the applicable bladders 20–38 in accordance with the pressure change commands. The headrest height command is next output to the driver 62 (FIG. 2) at a step 334 to drive the actuator 54 in direction to provide the desired headrest height. The current value of a controller clock taking any standard form is next stored in a controller memory device at a step 336 to mark the time of the adjustment of the seat 10 (FIG. 1). The operations of FIG. 3 are next concluded by returning, via a next step 336, to resume execution of any previously ongoing and temporarily suspended controller operations, such as standard maintenance and diagnostic operations generally understood by those possessing ordinary skill in the art.

Returning to step 310, if the prior occupation flag is determined to be set, then a determination is made of the time $T_A$ elapsed since the most recent prior seat adjustment at a next step 338. If the determined time $T_A$ exceeds a predetermined threshold which may be calibrated within the range of 0.01 seconds to 3600 seconds in this embodiment, with a typical value of about sixty seconds, at a next step 340, then a seat adjustment to account for any change in occupant position or orientation within the seat 10 (FIG. 1) or to reduce operator muscle fatigue is provided via steps 342–348. More specifically, a series of bladder pressure adjustment commands are determined at a step 342. Such adjustments may be made as a function of the current sampled seat bladder pressure information from the described step 306, for example in the manner detailed at the described step 320, or may consist of slight pressure increases or decreases in the bladders 20–38 (FIG. 2) of any type that will relieve pressure on certain operator muscle groups and generally provide for increased comfort over extended driving periods.

The pressure command adjustments are next output at a step 346 to the driver 76 (FIG. 2) for controlling the pumps 78 and 80 and the valve modules 72 and 74 to provide for an required bladder pressure changes, as described. The adjust time is next updated at a step 348, for example by storing a current value of a controller clock in a standard controller memory device, whereby the time of the next consecutive pressure adjustment may be determined, to reduce operator muscle fatigue, as described. The described step 350 is then executed to conclude the operations of FIG. 3.

Referring to FIG. 4, a series of controller operations to be carried out in this embodiment following any manual operator input of a seating attitude change command via the keypad 66 of FIG. 2 are illustrated. Generally, automatic seating control is provided when requested by an operator, such as a seat occupant, through depression of an automatic control key on the keypad 66 (FIG. 1). Such automatic control is terminated upon any seat bladder pressure change command via the keypad 66. A signal INT is provided from the keypad 66 (FIG. 2) to a standard controller input port and changes state upon any manual seating control input on the keypad. The applicable controller input port is configured to treat such change in state as an interrupt event, upon which event the controller 60 (FIG. 2) is directed to suspend its current operations and to carry out the operations of FIG. 4, beginning at a step 400 and proceeding to deactivate automatic control at a next step 402, such as by clearing the automatic control flag polled through the operations of FIG. 3 at the described step 304. The current set of bladder pressure values are stored as the current desired bladder pressure values at a next step 404 as a record of the current commanded pressure values for the bladders 20–38 (FIG. 2) whereby such values may be used to quickly return to the current seat bladder pressure values upon exiting the manual seat bladder pressure control mode. Further, the current headrest height is stored at a next step 406 as a value to return to upon re-entry of the automatic control mode of operation. The operator has the authority to manually request re-entry into the automatic seat control mode in this embodiment. Following the step 406, the interrupt service operations of FIG. 4 are concluded by returning via a next step 408, to any standard controller operations that were temporarily suspended to allow for execution of the operations of FIG. 4.

The preferred embodiment is not intended to limit or restrict the invention since many modifications may be made through the exercise of ordinary skill in the art without departing from the scope of the invention.

The embodiments of the invention in which a property or privilege is claimed are described as follows.

What is claimed is:

1. An automatic seating comfort control system, comprising:

a seat having a plurality of bladders disposed therein;

a fluid pressure control system for controlling passage of a fluid into and out of selected ones of the plurality of bladders;

at least one pressure transducer for transducing fluid pressure within the fluid pressure control system into at least one corresponding pressure signal; and a controller for receiving the pressure signal and for estimating seat occupant dimension information as a function of the received pressure signal, the occupant dimension information including at least one of occupant height and weight information;

the controller generating seating control signals as a function of the seat occupant dimension information and outputting the seating control signals to the fluid pressure control system to automatically control seating comfort.

2. The system of claim 1, wherein the seat is secured within an automotive vehicle having a plurality of vehicle control systems, the automatic seating comfort control system further comprising:

a communication link for communicating the seat occupant dimension information to at least one of the plurality of vehicle control systems.

3. The system of claim 1, wherein the at least one pressure transducer comprises a plurality of pressure transducers for transducing a plurality of pressures representative of the pressures within the plurality of bladders into a corresponding plurality of pressure signals, and wherein the controller receives the plurality of pressure signals and estimates occupant dimension information as a function of the received plurality of pressure signals.

4. The system of claim 3, wherein the seating control signals generated and output by the controller include desired bladder pressure control signals for the plurality of bladders for controlling seating firmness.

5. The system of claim 3, further comprising:

at least one seat position transducer for transducing seat orientation into at least one corresponding position signal;

and wherein the controller further receives the position signal and estimates seat occupant dimension information as a function of the received pressure signal and the received position signal.

6. The system of claim 3, wherein the seating control signals generated and output by the controller include at least one desired seat position control signal for controlling seating position.

7. The system of claim 6, wherein the seat includes a seatback and a headrest adjacent the seatback, the system further comprising:

an actuator secured within a first one of the group consisting of the seatback and the headrest, the actuator having an output shaft coupled to a second one of the group consisting of the seatback and the headrest, the actuator controlled in response to a headrest position control signal applied thereto to extend and retract the output shaft relative to the actuator to vary the position of the headrest relative to the seatback;

and wherein the at least one desired seat position control signal includes the headrest position control signal.

8. The system of claim 1, further comprising:

an operator interface for transducing a request for manual seating control from an operator into a manual control request signal and for transducing manual control commands from an operator into manual seat control command signals;

wherein the fluid pressure control system receives the manual seat control command signals and controls passage of a fluid into and out of selected ones of the plurality of bladders in response to the received manual seat control command signals;

and wherein the controller receives the manual control request signal and suspends automatic seating control operations upon receipt thereof.

9. A method for controlling firmness of an automotive vehicle seat having a plurality of fluid-filled bladders disposed therein and having a fluid pressure control system for varying the fluid pressure in individual ones of the plurality of fluid-filled bladders in response to pressure control commands, comprising the steps of:

transducing pressure within the fluid pressure control system into corresponding pressure signals;

periodically sampling the pressure signals;

sensing presence of an occupant within the seat;

upon sensing the presence, estimating attributes of the occupant as a function of the sampled pressure signals, the attributes including at least one of height and weight of the occupant;

generating desired pressure values for at least one of the plurality of fluid-filled bladders as a function of both the sampled pressure signals and the estimated attributes of the occupant;

determining pressure control commands as a function of the desired pressure values; and controlling pressure within at least one of the plurality of fluid-filled bladders in accordance with the determined pressure control commands.

10. The method of claim 9, the seat having a headrest adjacent thereto and an actuator for varying the position of the headrest relative to the seat in response to a headrest position control command, the method further for controlling automotive seat headrest position and further comprising the steps of:

calculating a desired headrest position as a function of the occupant attributes;

generating a headrest position command as a function of the desired headrest position; and controlling headrest position in accordance with the generated headrest position command.

11. The method of claim 9, wherein the automotive vehicle includes an additional vehicle control system, the method further comprising the step of:

communicating the estimated attributes of the seat occupant to the additional vehicle control system.

* * * * *